April 18, 1939.   R. W. COLTON   2,154,437
CONTROL MECHANISM APPLICABLE TO RADIO TUNING AND OTHER USES
Filed Jan. 5, 1934   3 Sheets-Sheet 1

Inventor
Raymond W Colton
By
Attorney

April 18, 1939.  R. W. COLTON  2,154,437
CONTROL MECHANISM APPLICABLE TO RADIO TUNING AND OTHER USES
Filed Jan. 5, 1934   3 Sheets-Sheet 2

Inventor
Raymond W. Colton
By
Attorney

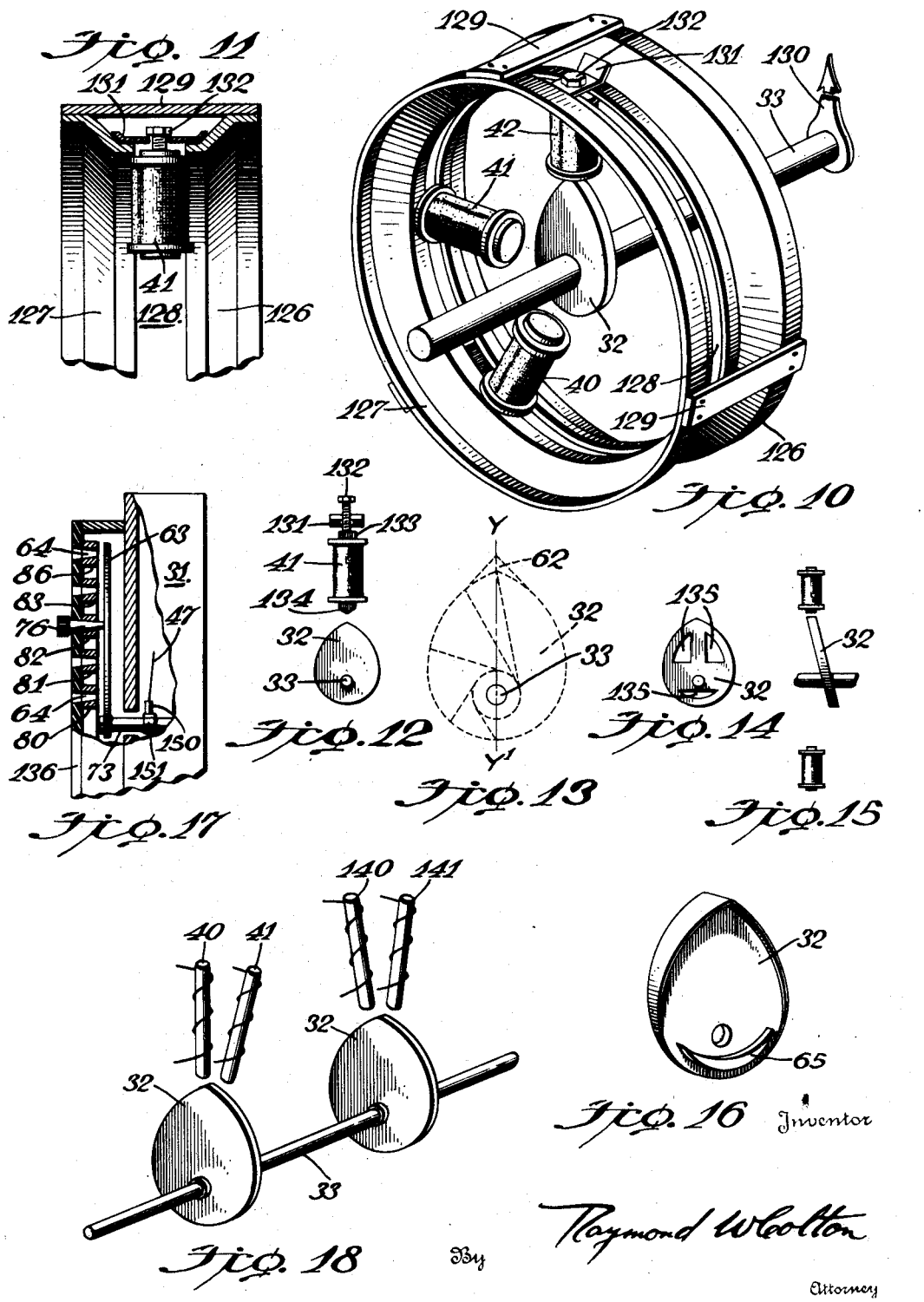

Patented Apr. 18, 1939

2,154,437

UNITED STATES PATENT OFFICE 2,154,437

CONTROL MECHANISM APPLICABLE TO RADIO TUNING AND OTHER USES

Raymond W. Colton, Washington, D. C.

Application January 5, 1934, Serial No. 705,420

7 Claims. (Cl. 250—20)

The present invention relates to control systems and more particularly to those systems employing the principles of electromagnets in their operation.

There are many mechanisms in present use for industrial, scientific and domestic purposes to which a remote control system readily adapts itself. Examples of these are radio circuits, indicators, signalling devices, switches, heat exchange and conditioning systems, vacuum apparatus, machinery of various types, etc. Until now no such control system has been developed to serve these purposes in a satisfactory and economical manner.

Attempts have been made to provide an apparatus which will answer the needs and adapt itself to the limitations heretofore mentioned. Their lack of general acceptance has been chargeable to expense in manufacture and maintenance, inaccuracy and undependability in results and difficulty in use.

Some prior devices include step-by-step motors which necessitate the energization of several independent circuits in sequence for the adjustment of a movable element from one position to another. Motors of this type also display a lack of the precision necessary in a large number of their applications, and having their stator coils fixed at the factory, are limited to those positions so fixed.

Another prior proposed type employs a continuously energized driving motor whose movements are utilized or not through various mechanical elements such as, clutches, worms, gears, chains, pawls, racks, pulleys and shafts, constituting a complicated and bulky assembly, entailing expense in manufacture as well as in maintenance.

Such prior devices have not been successful from a standpoint of simplicity or accuracy and are little adapted to automatic controlling as by time, temperature, humidity, etc. This coupled with difficulty in even their manual manipulation no doubt explains the dearth of art relating to mechanisms of the type contemplated by this invention.

The present invention purposes to solve these problems and overcome the faults and limitations inherent in prior systems by providing an electrically operated remote control system having a minimum number of parts, which is both simple and inexpensive, compact and dependable. It employs the effects of magnetic influence upon a movable member whose movements are transmitted to an element which is to have its position adjusted. The element to be moved may be a radio tuning device, an indicating needle, a damper, or in fact any device to be adjusted to a predetermined position and maintained there for a predetermined period. The magnetic influence is preferably exerted by selectively energized electromagnets, energized manually or automatically, and if the latter, by influence of time, temperature, humidity, sound, light, or other effects such as liquid level, fluid passage, pressure, etc. Besides controlling adjustments, it is also contemplated to control any supply circuit or circuits associated with the device which is to be adjusted.

These and other objects will become apparent from the following description, reference being had to the accompanying drawings.

In the drawings:

Fig. 10 illustrates a motor applicable to the requirements of the system, with shaft bearings and fastening means omitted.

Fig. 11 is a partial sectional view of Fig. 10.

Fig. 12 illustrates a detail.

Fig. 13 shows the development of a suitable rotor element.

Figs. 14, 15 and 16 are modifications of the rotor.

Fig. 17 shows a partial section of a suitable circuit controller.

Fig. 18 illustrates a further embodiment.

Figure 1:
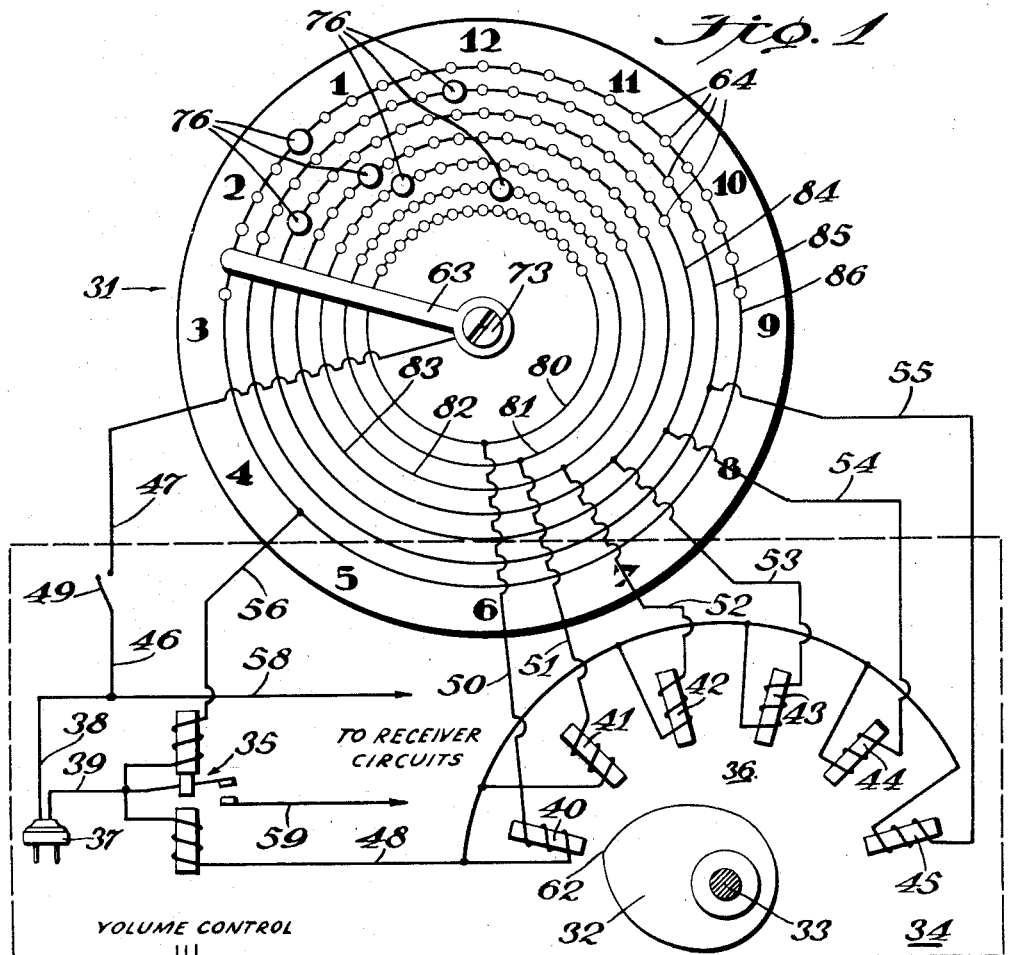
Fig. 1 is a schematic showing of one embodiment of the system.

Referring to Fig. 1, the system is shown as applied to a radiant energy receiver, generally indicated by 34, with receiving circuits omitted, which is provided with the customary tuning shaft 33 and a supply circuit switch 35. Mounted on the tuning shaft 33 is a rotor element 32 having a most prominent portion 62 which comes to rest in the proximity of any of its electromagnets which is energized. This rotor is influenced by the selectively energized electromagnets 40, 41, 42, 43, 44, and 45 the effective positions of which may be varied. These electromagnets and the rotor constitute a multipole motor generally indicated by 36. For the selective energization of these electromagnets, this embodiment of the invention utilizes time controlled contacts suitably arranged on a clock 31 or other synchronously operating device. Upon the face or rear of the clock 31, a series of conducting annuli 80, 81, 82, 83, 84 and 85 are mounted and from which suitable leads 50, 51, 52, 53, 54 and 55 respectively connect with one terminal of the windings of electromagnets 40, 41, 42, 43, 44 and 45 respectively. The remaining termini of the magnet windings are connected to a common lead 48 which is connected to one side 39 of a suitable source of current supply on the line side of the supply circuit switch 35 or in some cases it may be connected on the receiver side of switch 35. The other side 38 of the current supply source is connected to a lead 46 and through a suitable switch 49 and lead 47, connects with a wiper or contactor 63 driven by the hour shaft 73 of the clock 31. This wiper or contactor, by brushing against contacts or plugs 76 or the like, inserted in apertures 64 provided in the annuli 80, 81, 82, 83, 84 and 85 when the switch 49 is in closed position, completes the circuit from the current supply source through the magnet windings. The positions of the contacts carried by the annuli 80, 81, etc., are made adjustable by the provision of any desirable number of apertures 64, such as one for each fifteen minute position of the element 63 so that the electromagnets might be selectively energized at optional predetermined times in any desired order. Also connecting the clock 31 and the receiver 34 is the lead 56 which is provided with a contacting annulus 86, similar to those already described, provided with similar apertures 64 for the reception of similar contacts or plugs 76. The end of lead 56 entering the receiving set is associated with the switch 35, or an independent switch, for opening the operating circuits of the receiving set at prescribed times. The leads 60, 61 and 62 are shown emanating from the receiving set for the purpose of controlling the volume of the incoming signals in the event that there be no automatic provision for such control. The leads 58 and 59, leading from the source of supply which is tapped by means of an ordinary plug 37, are the customary leads for heating the vacuum tube filaments and supplying the various potentials and currents required by the set and its speaker.

It is of course understood that the application of this system to a radio receiver is by way of example only and is not a limitation upon the possible applications of the system. The tuning shaft 33 may be that of a variable capacity, variable inductance, or both, or any other element to be adjusted; or the element to be adjusted may be carried directly by the body of the rotor 32. The shaft 33 may be a main shaft to be positioned, or an auxiliary shaft geared or connected in any manner to the main shaft. The switches 35 and 49 may be of any type, either single or multiple pole, single or multiple throw. The rotor 32 may be of any suitable shape, circular or non-circular; or construction, solid or laminated, wound or unwound, cut-out or composite; or of any suitable material, magnetic such as iron or steel, or merely conducting such as copper or aluminum in the event that eddy currents set up the rotation when energized by alternating or pulsating current. The electromagnets 40, 41, etc., may in some cases be either solenoids or horseshoe magnets instead of bar magnets as shown, or may have magnetic cores of solid or laminated material. Their adjustments may be made by bodily moving them, by providing pole tips whose positions may be varied, or in any other manner. The clock 31 may be either mechanically driven or electric. Any other synchronously running mechanism may be used, or such devices may be replaced by contacting mechanism of an entirely different type, sensitive to light intensity, temperature, humidity, etc., or by manually operated switches.

The operation of the system as illustrated in Fig. 1 is as follows: Assuming that the magnets 40, 41, 42, 43, 44 and 45 have been adjusted so that upon their energization in the order mentioned, the rotor responds and turns the tuning element to such positions that the received frequency corresponds to that of broadcasting stations A, B, C, D, E and F respectively. Assuming further that the desired program is as follows:

| Time | Desired condition |
|---|---|
| 11:45 | B |
| 12:15 | F |
| 1:00 | C |
| 1:15 | D |
| 1:30 | Silent |
| 2:00 | E |
| 2:15 | A |
| 2:30 | D |
| 2:45 | C |
| 3:00 | E |
| 3:15 | F |
| 3:45, etc. | Silent, etc. |

The whole program may be set up in advance. The plugs 76 carried by the annuli 80, 81, etc., are accordingly disposed with reference to suitable markings on the annuli, so that at 11:45 o'clock the wiper carried by the clock makes the circuit through lead 51 to the magnet 41. As the switch 49 has been closed in advance for automatic control, current flows from the source through leads 38, 46, switch 49, lead 47, wiper 63, a plug 76, annulus 81, lead 51, winding of magnet 41, lead 48, and back to the source through lead 39. Electromagnet 41 being thus energized causes rotation of rotor 32 until a diameter through its portion 62 is directly aligned with the effective axis of the magnet, thus obtaining a like adjustment of shaft 33 and proper tuning of the receiving circuit. Similarly, the stations F, C and D will be "tuned-in" at the prescribed times. By means of the flow of current as above, in a manner to be later described, simultaneously with the energization of the magnet 41 the current supply circuit is completed to the receiving set which is thus set into operation for broadcasts from station B. In the event that the receiving set is not provided with automatic volume controlling means, the leads 60, 61, and 62 for controlling the volume may be carried to any remote point for manual control. Modern sets however will in most cases not require the latter. At 1:30 o'clock the contactor 63 makes the circuit through a previously inserted plug 76, annulus 86 and lead 56 automatically causing a break in the supply circuit, in a manner also to be described later, whereupon the set will be silent until 2:00 o'clock when the contactor causes a flow of current through the winding of electromagnet 44 in a similar manner to that described with reference to the winding of magnet 41, attracting portion 62 of the rotor thereto and remaking the supply circuit. In this manner programs from any number of different transmitters, depending upon the number of electromagnets employed, may be automatically received at any predetermined time or times, as far in advance as may be desired, depending upon the limitations of the timing mechanism employed. The automatic control may be discontinued at any time by merely opening the switch 49, whereupon the receiving set may be operated entirely manually in the ordinary manner. Whereas the switch 49 is indicated as combined with the radio set it might equally be mounted upon the clock or at some remote point.

Figure 2:
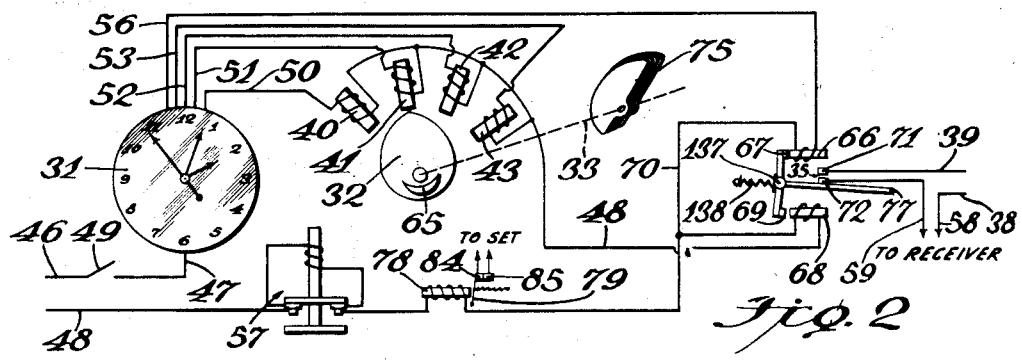
Fig. 2 is a diagram of a modified form.

In Fig. 2, the system is shown in a somewhat modified form over Fig. 1. Here the clock 31 is generally shown as the contacting means, the circuit opening and closing mechanism being of any suitable type operated by the movement of the clock, directly or through appropriate gearing. In this figure the current for energizing the electromagnets supplied by leads 46 and 48 is indicated as separate from the main current supply through leads 38 and 39. It is thus possible that the two current sources may be entirely independent and either alternating or direct, or that the leads 46 and 48 may be tapped from the main source at less or greater voltages than the main source. The leads 46 and 48 may be taken from a suitable transformer or potentiometer in the receiving set or in other cases tapped directly from its rectifier. It is to be understood however that a common source may be used, in which event the connections would be similar to those of Fig. 1. The switch 35 in this instance is shown as a snap switch operable either manually by the arm 77 which is pivoted at 137 and releasably held in either position by a spring 138, or magnetically by the magnets 66 and 68 acting upon the armatures 67 and 69 respectively. When a plug has been inserted in one of the apertures of annulus 86 and wiped by the contactor 63, (Fig. 1), current flows from the source through lead 46, switch 49, lead 47, the contactor, annulus 86, lead 56, winding of magnet 66, lead 70 and lead 48 to the source, whereupon magnet 66 becomes energized, exerts a pull upon armature 67 and opens the switch 35. Whenever contactor 63 engages a plug inserted in one of the annuli 80, 81, 82, or 83, the winding of magnet 68 being in series with the winding of magnet 40, 41, 42 or 43 as the case may be, exerts a pull upon armature 69 and closes switch 35. The rotor 32 is shown as provided with a predesigned weight 65 which serves as a counterbalance for the rotor to maintain it in any given position until such time when another electromagnet brings it to a new position. On the rotor shaft 33 a variable condenser 75 is diagrammatically shown. Also in series with the common return 48 of the electromagnets 40, 41, 42 and 43, there is an electromagnet 78 provided with an armature 79, so that upon passage of current through its winding the armature is attracted for breaking the circuit completed by contacts 84 and 85 leading to one of the receiving set circuits, so that during any adjustment, undesirable sounds due to opening and closing circuits or passing over a series of frequencies will not be heard from the speaker. The contacts 84 and 85 will in some cases be actuated by the electromagnet 68 which will thus serve a dual purpose and the magnet 78 in this case could be dispensed with, or in a like manner magnets 40, 41, etc., could serve additionally as relays for interrupting the reception of signals by providing them with suitable armatures and contacts such as armature 79 and contacts 84 and 85. Also shown as connected in series with the common return 48 is a time controlled relay 57 to be discussed in connection with Fig. 5.

Figure 3:
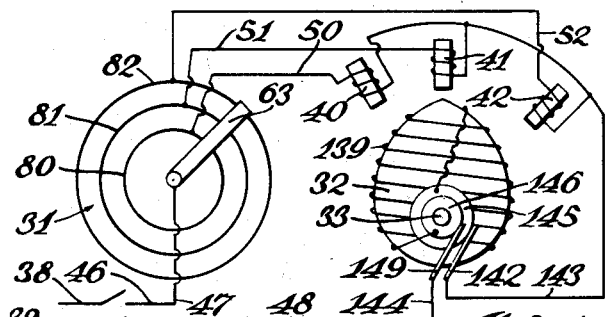
Fig. 3 shows the system of Fig. 1 in another modified form.

Fig. 3 shows the system in simplified form where it may be used for adjusting any type of device and in which no means is shown for breaking the main supply circuit. In this figure the rotor 32 is shown however as provided with a coil or winding 139 the terminals of which may be connected to suitable collector rings 145 and 146 or one terminal may be grounded to the rotating system. By connecting these terminals in series with the common return 48 through the collector rings and suitable brushes 142 and 149, when one of the magnets 40, 41, etc., is energized there is a flow of current through winding 139 which sets up a magnetic flux in the rotor in the direction of its major diameter, in cooperation with the effect produced by magnets 40, 41, etc., to increase the effective torque. The path of the current when the contactor engages a plug in annulus 81, for example, is as follows: From source through lead 38, lead 47, contactor 63, annulus 81, lead 51, winding of magnet 41, lead 143, brush 142, ring 145, winding 139, ring 146, brush 149, lead 144, to common return 48 and to source by way of lead 39. The winding 139 may be wound in suitably provided slots or directly on the rotor, or around the shaft 33 in the vicinity of the rotor. Such a winding may be employed with the rotors of any of the modifications.

Figure 4:
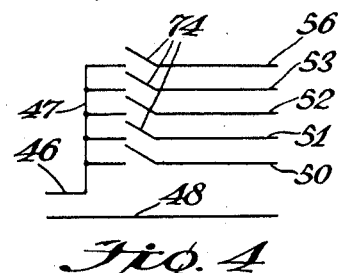
Fig. 4 illustrates a portion of the system shown in Fig. 2 using different circuit making and breaking devices.

Fig. 4 shows an alternative method for making the contacts where a timing device is not contemplated. Instead of a clock as in Fig. 2, a series of switches 74 are provided in the leads 50, 51, 52, 53 and 56 corresponding to those same leads in the other figures. These switches 74 may be manually operated or they may be thermostatic, light sensitive, humidity sensitive or of any other type and may be located at any point remote from the device to be adjusted.

Figure 5:
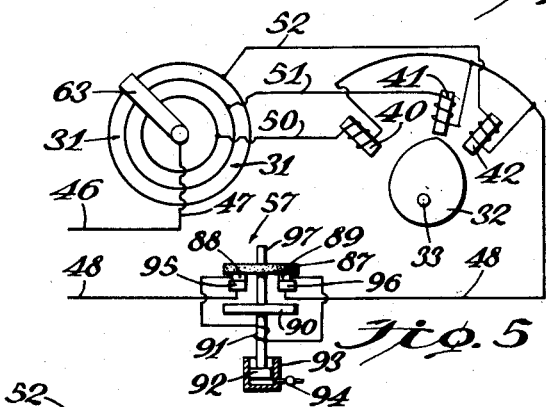
Fig. 5 is similar to Fig. 3 with relay means included.

Fig. 5 illustrates the device similar to that of the preceding figures, having a relay connected to one of the common leads in order that the electromagnets 40, 41 and 42 will be energized only for a sufficient time to bring the rotor into position at which time the circuit will be broken until the contactor 63 has moved off of a particular plug whereupon the relay will again become operative in time for the next energization. One purpose of so breaking the flow of current is to prevent hum or chattering which proves to be more of a problem when alternating current is being used. This expedient further promotes economy. As shown, the relay is in normal position during which conducting elements 87 and 88 carried by an insulating member 89 contact with the return lead terminals 96 and 95 respectively, completing the energizing circuit through the solenoid 91. Upon the passage of current through the circuit, as explained relative to the preceding figures, of one of the electromagnets 40, 41 or 42, the solenoid 91 is energized causing the piston 92 carried by the core 97 to rise quickly drawing air into the cylinder 93 through the check valve 94. During this time the solenoid circuit is broken and the main circuit is closed by the conductor 90 bridging the terminals 95 and 96. The valve 94 having a restricted outlet opening releases air from the cylinder 93 but gradually, hence after a sufficient time has elapsed for the rotor 32 to assume its final position, the conductor 90 breaks its contact with the terminals thus interrupting the flow of current. After the contactor 63 has withdrawn from its last contacted plug, the weight of the piston and the system supported thereby will have completely exhausted the cylinder 93 and the contacts 87 and 88 will have returned to their normal position bridging the gap between terminals 95 and 96 setting the solenoid in readiness for the next energizing operation. Such a relay or any other time delay relay may be equally used in conjunction with any of the other figures of the drawings. Should the time lag of the up stroke of the piston be sufficient, the conductor 90 might be dispensed with.

Figure 6:
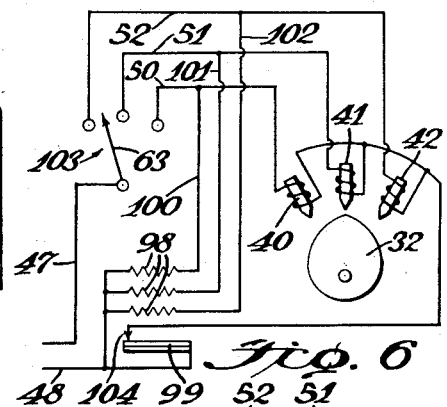
Fig. 6 shows another relay arrangement.

Fig. 6 shows one manner in which a thermal relay may be applied to the system where the leads 50, 51, and 52 extending from a circuit controlling device 103 to the electromagnets 40, 41, and 42 are provided with local circuits containing individual heating elements 98 connected to the leads by the wires 100, 101, and 102 respectively. Included in the common return lead from the magnets to the source, is a thermal element 99 which upon sufficient heating of one of the elements 98 withdraws from the contact 104 to break the circuit through the electromagnets. This circuit remains broken as long as heat is supplied by the elements 98 which are supplied with current from the source through lead 47, contactor 63, lead 50, 51 or 52, lead 100, 101 or 102, and to source through lead 48. These elements remain in circuit until the circuit is broken at 103, whereupon they cool and the thermal element 99 returns to normal position for a new energization of one of the magnets when contactor 63 again completes a circuit. This expedient is equally suitable in any of the foregoing circuits.

Figure 7:
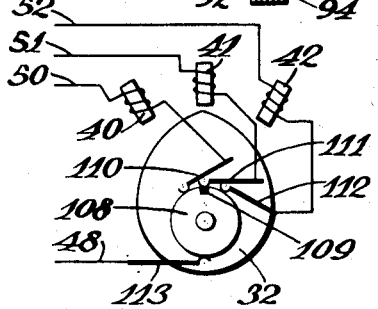
Fig. 7 represents current interrupting means applicable to the invention.

Another means for interrupting the passage of current through the electromagnets 40, 41 and 42 is depicted in Fig. 7. This arrangement provides a conducting ring 108 on the rotor shaft, the ring being provided with a small insert of insulating material 109. The windings 40, 41 and 42 are connected to brushes 110, 111 and 112 respectively which bear upon the ring and which may have their positions adjusted to correspond with adjustments of their respective magnets. The common lead 48 is also provided with a brush 113 which bears upon the ring. Brushes 110, 111 and 112 corresponding to magnets 40, 41 and 42 respectively are so positioned that when the rotor is attracted by energization of one of the windings and attains its final position, the insert 109 breaks the circuit formed through the ring leaving the circuits of the remaining magnet windings closed ready for the next positioning operation.

Figure 8:
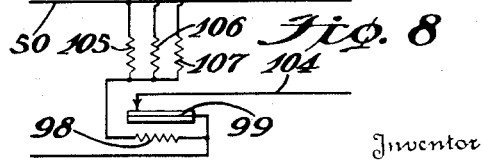
Fig. 8 shows a modification of Fig. 6.

Fig. 8 is a modification of Fig. 6 wherein a single heating element 98 is employed in lieu of one for each circuit as in Fig. 6. To prevent the division of current in this modification, suitable resistances 105, 106 and 107 are employed. Without such resistances or their equivalent, the leads 50, 51 and 52 would each receive a portion of the current and their magnets 40, 41 and 42 (not shown) would become simultaneously energized rendering the system inoperative. The design of these resistances is such that a sufficient current will be present in both heating and magnetizing circuits for performance of the respective functions.

Figure 9:
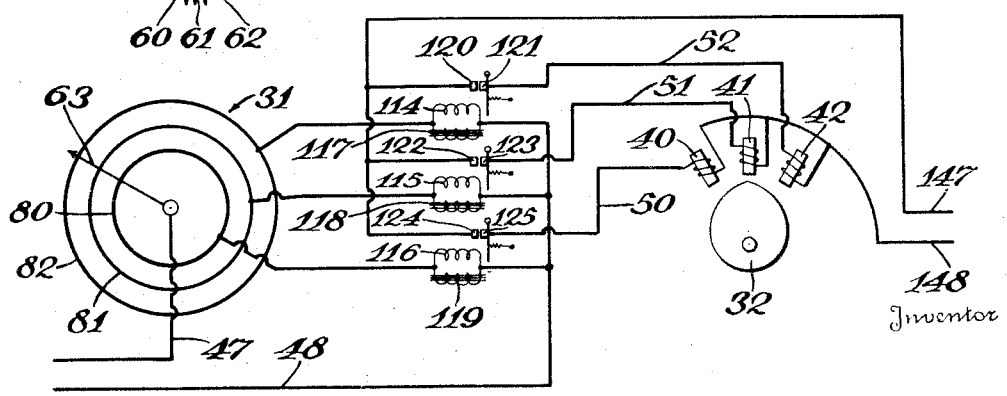
Fig. 9 shows the circuits using another relay arrangement.

Fig. 9 illustrates the possibility of using separate sources of current in the contactor circuits and the motor circuits, while on the other hand if desirable the sources might be the same. In this form, as well as in the others, the contacts completed by element 63 may be made by snap action to produce what is known as instantaneous contact. The windings 114, 115 and 116 upon selective energization from source through lead 47, contactor 63, annulus 82, 81 or 80, winding 114, 115 or 116 and to source through lead 48, attract their respective spring retracted armatures carrying contacts 121, 123 and 125, to complete a circuit through the contacts 120, 122 and 124 respectively to energize through their respective leads 52, 51 and 50 the electromagnets 42, 41 and 40. Associated with the windings 114, 115 and 116 there are windings 117, 118 and 119 along with their cores which are so designed that the contacts made by the armatures will be maintained for a time sufficient for the rotor 32 to come into position, whereupon all circuits are broken, prepared for a new operation when contactor 63 again closes a circuit. The windings of electromagnets 40, 41 and 42 are supplied with current through contacts 124—125, 122—123 and 120—121 respectively, from a source denoted 147, 148.

A convenient form of motor to be used in conjunction with the already described system is shown in Fig. 10. It comprises a frame made up of two similar annular members, 126 and 127, held in spaced relation as at 128 by means of a suitable number of straps 129 fastened to the frame sections in any suitable manner. Adjustably received in the slot formed by the spaced members are a series of bolts 132 or other fastening means for engagement with the electromagnets 40, 41, 42, etc. Suitably mounted with respect to the frame is a shaft 33 carrying a suitable rotor 32. At some point on the shaft 33 an element to be positioned in accordance with the adjustment of the magnets is disposed in any suitable manner and is denoted by 130. The rotor in this instance is preferably of magnetic material and is symmetrical with respect to only one diameter, namely that extending through its most prominent point. Its periphery approximates arcs of two similar spirals so that when it is subjected to the magnetic flux emanating from one of the magnets, the reluctance to the lines of force decreases progressively during the rotation. Other forms may be given to the rotor to accomplish a similar result, for example its periphery may define a circle and its edge may be progressively thickened. It may be unitary or laminated, webbed or solid. It may be compositely formed of a magnetic material and a non-magnetic material. Any suitable type of counter-balancing means may be used to compensate for its eccentricity, and in fact it may receive sufficient counterbalancing to compensate additionally the whole rotating system such as element 130 in the figure. It may be positioned with its plane horizontal or vertical and may be provided with any suitable damping means such as vanes. Up to this point the electromagnets have been shown within an arc of 180°, with the assumption that the element to be positioned does not necessitate a greater rotation. However should it be desired to produce greater angular displacements it would merely require adjustment of the magnets illustrated or the provision of additional magnets in order that the motor would perform in a manner similar to the well known step-by-step motor, yet not require sequential energization of adjacent magnets. In such a case however, the rotor would turn in that direction which necessitates its smaller angular displacement and would be suitable where the direction of rotation assumed by the rotor is immaterial.

Fig. 11 shows a part of the motor of Fig. 10 in cross section where a clamping element 131 is disposed between the head of bolt 132 and the surfaces of members 126 and 127 for producing a larger bearing surface. The adjustment of the electromagnets is accordingly accomplished by loosening the bolt 132 and shifting the electromagnet to a new position. As heretofore provided however the adjustment may be accomplished by other means such as an adjustable pole-piece, rack and pinion mechanism, or any adjusting means by virtue of which the required precision may be attained.

To increase the precision of the system the cores 133 of the magnets 41, etc., may have their tips chamfered as shown at 134 in Fig. 12, and diagrammatically in Fig. 6, or shaped in any other manner to produce a greater flux density at the pole tips. The core in this case is shown as laminated but it might equally be solid. Having a sharpened tip, the lines of force produced by the magnet will be concentrated and taking into consideration the prominent point of the rotor, very sharp adjustments will be possible, making for sharp tuning in the case of radio receivers.

The development of the rotor is exemplified in Fig. 13 which shows for illustration only the development of the Archimedes spiral. As is well known the distance from a point on the curve to the center of the circle about which the spiral is generated, progressively increases. The rotor in this instance is provided with a portion 62 more prominent than would be achieved by merely using a spiral. However this portion 62 might be dispensed with. Any form of curve having a progressively increasing radius may be used in developing the rotor, which will produce similar results.

In Figs. 14, 15 and 16 various forms of rotors are shown. In Fig. 14 the cut-out portions 135 serve as one means for counterbalancing. In Fig. 15 the rotor is shown as angularly mounted upon its shaft and as having one point more prominently in the field of the electromagnets than any other point. In Fig. 16 a counterweight 65 is provided and the edge of the rotor is shown as progressively thickened.

A suitable time actuated circuit controlling mechanism for the system is shown in Fig. 17, where 73 is a clock shaft extending through the rear of the clock, and carrying a suitable contactor 63. Numerals 80, 81, 82, and 86 represent the annuli already referred to, provided with apertures 64. These annuli may be mounted upon a suitable insulating panel 136. The contact making plugs which may be provided with a head of insulating material are illustrated at 76. Current is supplied to the contactor 63 by lead 47 which may be connected by a brush 150 and conducting ring 151, or by a light spiral lead, or in any other suitable manner. Suitable indications will preferably be provided to identify the time and transmitting station represented by each aperture. Any desired form of circuit controlling mechanism may be adapted to the requirements of the invention.

Fig. 18 shows a plurality of rotors mounted upon the same shaft, each provided with a plurality of electromagnets 40, 41, and 140, 141. This embodiment may be used where the desired adjustments of the shaft 33 are so close together that the size of the electromagnets would prevent such close adjustment should only a single row of magnets be employed. Similarly, a single sufficiently thick rotor might be used with two or more rows of electromagnets for a like result.

It is well within the purview of the present invention to employ a bar or rod of magnetic material serving as a common movable core for a plurality of solenoids and responsive to any of the solenoids which may be energized. In this case the core would be connected to the element to be positioned.

This invention is not to be construed as limited to any specific use or structure except as provided in the claims, and it contemplates a reasonable range of equivalents.

I claim:

1. Control mechanism for radio circuits comprising a variable element reversible in its movements in one of the radio circuits, a current supply circuit for operating said radio circuits, electromagnetic means for positioning said variable element by attraction automatically as a function of time through its shortest path to a desired setting and controlling said current supply circuit and a time delay relay in circuit with said electromagnetic means for interrupting said means.

2. Selecting mechanism comprising an element to be positioned, a plurality of selectively energized electromagnets, each provided with a circuit, a member for imparting motion to said element and responsive by attraction to any of said eletcromagnets having its circuit closed, means for closing a plurality of predetermined circuits in any desired order for effecting predetermined settings of said element and means responsive to the closing of any of said circuits to open the same after a predetermined time.

3. Selecting mechanism comprising an element to be positioned, a plurality of selectively energized electromagnets each provided with a circuit, a member for imparting motion to said element and responsive to any of said electromagnets having its circuit closed, means for closing a predetermined circuit for effecting a predetermined setting of said element and electrically energized means responsive to the closing of any of said circuits to open the same after a predetermined time and to reclose same after another predetermined time.

4. Selecting mechanism comprising an element to be positioned, a synchronously driven contactor for controlling a plurality of selectively energized electromagnets each provided with a circuit, a magnetic member for imparting motion to said element and responsive by magnetic attraction to an electromagnet having its circuit closed and means including a time delay relay for closing, opening and reclosing a predetermined circuit in response to the selection of one of said electromagnets.

5 Selecting mechanism comprising an element to be positioned, a plurality of selectively energized electromagnets having a common lead, a member substantially coplanar with the axes of said electromagnets for imparting motion to said element and responsive by attraction to any of said electromagnets which is energized, and a time delay relay in series with said common lead.

6. Selecting mechanism comprising an element to be positioned, a plurality of selectively energized electromagnets having a common lead, a member for imparting motion to said element and responsive to any of said electromagnets which is energizend, and a time delay relay in series with said common lead for interrupting the circuit of said common lead.

7. Selecting mechanism comprising an element to be positioned, a plurality of electromagnets provided with electrical circuits, an armature in magnetic circuit with said electromagnets and connected to said element, synchronous means causing the electrical circuits of said electromagnets to be automatically energized, and electrically energized means responsive to the closing of any of said circuits to open the same after a predetermined time and to reclose the same after another predetermined time.

RAYMOND W. COLTON.